E. J. ALLEN.
SURFACE COMBUSTION BURNER.
APPLICATION FILED FEB. 10, 1915.

1,139,321.

Patented May 11, 1915.

Witnesses
Beulah Carle
D. E. Walz

Inventor
Ernest J. Allen,
by Frederick W. Cameron
Atty.

UNITED STATES PATENT OFFICE.

ERNEST J. ALLEN, OF ALBANY, NEW YORK, ASSIGNOR TO RATHBONE, SARD & COMPANY, OF ALBANY, NEW YORK, A CORPORATION.

SURFACE COMBUSTION BURNER.

1,139,321.   Specification of Letters Patent.   Patented May 11, 1915.

Application filed February 10, 1915. Serial No. 7,256.

*To all whom it may concern:*

Be it known that I, ERNEST J. ALLEN, a subject of King George V of Great Britain, residing in the city and county of Albany and State of New York, have invented certain new and useful Improvements in Surface Combustion Burners, of which the following is a specification.

Figure 1:
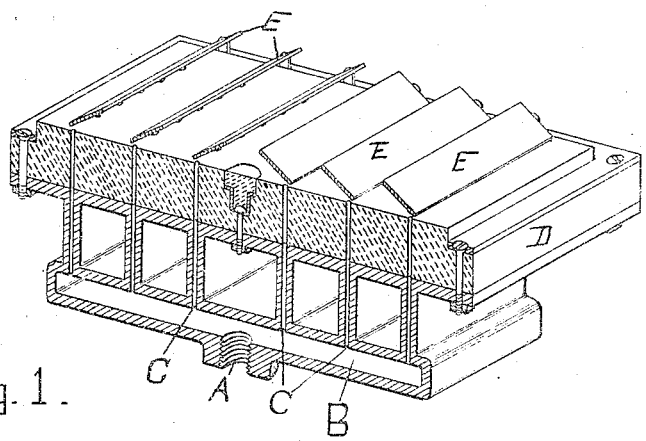
Figure 2:
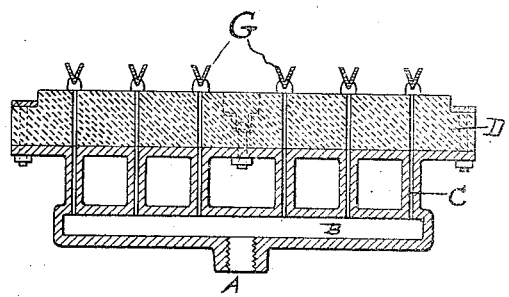

My invention relates to surface combustion burners, and the object of my invention is to provide a hearth with means for causing the flow of gas mixture through the hearth to be uniform, providing for the products of combustion to be discharged in any desired direction, and exposing the entire incandescence of the hearth and fire bed for radiation to the object to be heated; together with such elements and combinations as are hereinafter more particularly set forth and claimed. I accomplish these objects by means of the mechanism illustrated in the accompanying drawing, in which:

Figure 1 is a perspective view of a section of my invention. Fig. 2 is a cross section of a modified form of my invention.

Similar letters refer to similar parts throughout the several views.

Surface combustion burners with which I am familiar provide for the conveyance of a gas mixture to the burner base by a pipe and then through tubes of suitable diameter and length to the hearth upon which rests the fire bed or combustion zone proper, and in the fire bed there are three types of baffles used; first, loose refractory granulated material placed upon a suitable hearth; second, bonded porous diaphragms composed of granular refractory material; and third, disks or plates made from non-oxidizing metal suitably perforated for the products of combustion to pass through. The function of these types of baffles is to lower the rate of the mixture of gas and air flowing through the fire bed to a point where it will not be greater than the rate of combustion and blow off. The gas passes through the burner tubes into the fire bed at a higher velocity than the rate of burning or combustion, and where retarded sufficiently by the granular baffle, the mixture burns between the granules raising them to a high point of incandescence. If, however, the mixture is at a comparatively low pressure passing through the burner tubes, which are necessarily small, the loose refractory material placed over them partially closes a large percentage of these holes and will cause a difference in the rate of flow through the different tubes. If a piece of fire bed material is laid directly over the tube orifice, the flow from that particular orifice will be throttled and greatly reduced. In other holes where by chance the loose material is bridged over the orifice leaving it practically clear, the flow will not be retarded to any extent except by the natural resistance of the fire bed, which increases considerably as the fire bed becomes hot and reaches a constant temperature for the volume of gas heated. Another condition exists in this form of fire bed which is the radiation of the fire bed material. The gas mixture burns in the voids between the refractory granules and the heat generated by combustion is absorbed by the fire bed which reaches a high state of incandescence, causing these granules to radiate their heat from one to another and in all directions. A large proportion of this radiant heat is projected from the combustion zone to the fire brick hearth or burner lining, which in turn sends its heat rays back to the fire bed. The hearth also absorbs heat from the fire bed by conduction and the metal part of the burner becomes hot and in turn also radiates the heat absorbed from the hearth. This condition is not objectionable where a low rate of gas is being burned per unit area and the burner base is not inclosed, giving it an opportunity to radiate freely. When, however, the gas mixture is increased to a much higher rate per unit area and the burner is placed in a confined space where considerable of its heat would be reflected back into the fire zone, the following conditions would arise:—The fire bed having more gas burned in the same unit area would reach a much higher temperature and the rate of combustion be greatly accelerated; the fire bed would offer a greater resistance and the hearth absorb more heat. The metal part of the burner also becomes very much hotter, in fact, sometimes blood red heat, preheating the incoming mixture to a temperature near the ignition point. When this condition occurs should any hearth orifice be partially choked by reason of the fire bed material resting directly over it, and the hearth become heated above ignition temperature to any depth, back fire would result.

My invention eliminates the unsatisfactory conditions in the following manner:— The gas mixture passes through a pipe registering with the opening, A, into the mixing chamber, B, from which the air and gas forming the mixture pass through the restricted conduits, C. Adjustably mounted at the side of the hearth are the baffle plates, E, which may be placed at such an angle to the hearth, D, as is desired, but preferably so placed that the baffle plates will project above the conduits, C, C, in the hearth.

I have also shown in Fig. 2 a similar hearth and connections, with the exception that the baffle plates, G, G, are arranged in V-form. As thus arranged the gas mixture is introduced to the hearth in such position that the jet of flame of the burning mixture is projected against the baffle plates, E, which are placed at an angle and cause the mixture to spread out into a fan-like shape, burning on the hearth side of the baffle plates. These baffle plates, E, become very hot and radiate their heat outwardly from the fire bed on one side and against the fire brick hearth on the other. The fire brick in turn becomes incandescent and radiates its heat in an outward direction, thereby keeping the fire brick hearth below the temperature of deterioration and increasing the efficiency of the burner greatly, in other words, exposing the entire incandescent portions of the hearth and fire brick for radiation to the object to be heated. The flow of gas mixture through the hearth is uniform, there being no opportunity for the materials forming the fire bed entering or choking the orifice of conduits, C. There is small change in resistance of fire bed from cold to a constant working temperature. The products of combustion can be discharged in any desired direction resulting in a more flexible distribution of heat.

I do not, however, limit myself to any particular form of baffle plate, nor to the angle to which it is placed in reference to the hearth.

What I claim as my invention and desire to secure by Letters Patent is:

1. In a surface combustion burner, a hearth arranged to expose the entire incandescent surface for radiation to the object to be heated and provided with a series of openings for the passage of a gas mixture; with a baffle plate adjusted above the hearth against which the gas mixture will impinge and burn.

2. In a combustion gas burner, a hearth composed of fire brick; a mixing chamber beneath the hearth; means for conducting the gas mixture into said mixing chamber; conduits extending from said mixing chamber to the top of the hearth; and baffle plates placed at an angle to the hearth above the openings in said conduits, substantially as described and for the purpose set forth.

3. In a surface combustion burner, a hearth adapted to expose its entire incandescent surface and fire bed portion for radiation to the object to be heated; a series of baffle plates mounted at an angle to the surface of the hearth; and a series of unobstructed passageways extending through the hearth, permitting the uninterrupted flow of gas mixture through the hearth and its delivery to and burning at the hearth side of said baffle plates.

In testimony whereof I have affixed my signature in presence of two witnesses.

ERNEST J. ALLEN.

Witnesses:
 BEULAH CARLE,
 FREDERICK W. CAMERON.